United States Patent
Flint et al.

(10) Patent No.: US 8,815,060 B2
(45) Date of Patent: Aug. 26, 2014

(54) METHOD FOR MINIMIZING MAGNETICALLY DEAD INTERFACIAL LAYER DURING COC PROCESS

(75) Inventors: Eric Wayne Flint, San Jose, CA (US); Ning Shi, San Jose, CA (US); Qi-Fan Xiao, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 2341 days.

(21) Appl. No.: 10/930,377

(22) Filed: Aug. 30, 2004

(65) Prior Publication Data

US 2006/0044678 A1 Mar. 2, 2006

(51) Int. Cl.
| | | |
|---|---|---|
| *C23C 14/00* | (2006.01) | |
| *C23C 14/32* | (2006.01) | |
| *B44C 1/22* | (2006.01) | |
| *C03C 15/00* | (2006.01) | |
| *C03C 25/68* | (2006.01) | |
| *C23F 1/00* | (2006.01) | |
| *C23C 14/02* | (2006.01) | |

(52) U.S. Cl.
USPC ............ 204/192.34; 204/192.23; 204/192.35; 216/22; 216/66; 427/534

(58) Field of Classification Search
USPC ............... 29/603.12; 360/125.02, 126, 235.2, 360/235.4, 236.6, 317, 324.1; 428/141, 428/216, 332; 438/149; 204/192.34; 216/22, 66; 427/534
See application file for complete search history.

(56) References Cited

U.S. PATENT DOCUMENTS

| | | | | |
|---|---|---|---|---|
| 4,647,494 A | * | 3/1987 | Meyerson et al. ............ | 428/216 |
| 4,999,318 A | | 3/1991 | Takahumi et al. ............ | 437/194 |
| 5,052,099 A | | 10/1991 | Taguchi et al. ................ | 29/603 |
| 5,118,577 A | | 6/1992 | Brar et al. ..................... | 428/409 |
| 5,405,646 A | | 4/1995 | Nanis et al. ................... | 427/131 |
| 5,438,747 A | * | 8/1995 | Krounbi et al. ............ | 29/603.16 |

(Continued)

FOREIGN PATENT DOCUMENTS

| | | | | |
|---|---|---|---|---|
| WO | WO 95/23878 | | 8/1995 | ............ C23C 14/00 |
| WO | WO 9810115 A1 | * | 3/1998 | |
| WO | WO 98/10115 | | 12/1998 | ............ C23C 14/34 |

OTHER PUBLICATIONS

N. Akita, Y. Konishi, S. Ogura, M. Imamura, Y.H. Hu, X. Shi, "Comparison of Deposition Methods for Ultra Thin DLC Overcoat Film for MR Head," 2001, Diamond and Related Materials, 10 (2001) 1017-1023, www.elsevier.com/locate/diamond.

(Continued)

*Primary Examiner* — Michael Band
(74) *Attorney, Agent, or Firm* — Zilka-Kotab, PC

(57) ABSTRACT

A method for applying a protective layer to an electronic device such as the ABS of a slider, magnetic head, etc. for reducing paramagnetic deadlayer thickness includes selecting an etching angle for minimizing formation of a paramagnetic deadlayer at an interface of an electronic device and an adhesive layer subsequently formed on the electronic device, etching a surface of an electronic device at the selected angle, the selected angle being less than about 75 degrees from an imaginary line extending perpendicular to the surface, forming an adhesive layer on the etched surface of the electronic device, and forming a protective layer on the adhesive layer. A magnetic head formed by the process is also disclosed.

22 Claims, 4 Drawing Sheets

(56) References Cited

U.S. PATENT DOCUMENTS

| | | | |
|---|---|---|---|
| 5,563,754 A * | 10/1996 | Gray et al. | 360/125.34 |
| 5,609,948 A * | 3/1997 | David et al. | 428/216 |
| 5,614,314 A * | 3/1997 | Itoh et al. | 428/332 |
| 5,766,727 A * | 6/1998 | Moroishi et al. | 428/141 |
| 5,777,824 A | 7/1998 | Gray et al. | 360/103 |
| 5,808,832 A * | 9/1998 | Chen et al. | 360/235.2 |
| 5,841,608 A * | 11/1998 | Kasamatsu et al. | 360/236.6 |
| 5,920,449 A * | 7/1999 | Tagawa | 360/122 |
| 5,939,133 A | 8/1999 | Ganapathi | 427/127 |
| 5,997,755 A * | 12/1999 | Sawada | 216/22 |
| 6,023,840 A * | 2/2000 | Chen et al. | 29/603.12 |
| 6,037,052 A * | 3/2000 | Chen et al. | 428/332 |
| 6,043,959 A * | 3/2000 | Crue et al. | 360/317 |
| 6,119,331 A * | 9/2000 | Chang et al. | 29/603.14 |
| 6,141,859 A * | 11/2000 | Ishiwata et al. | 29/603.12 |
| 6,243,233 B1 | 6/2001 | Yamamoto et al. | 360/236.6 |
| 6,320,725 B1 * | 11/2001 | Payne et al. | 360/125.02 |
| 6,324,747 B1 | 12/2001 | Boutaghou et al. | 29/603.12 |
| 6,328,859 B1 * | 12/2001 | Hsiao et al. | 204/192.34 |
| 6,404,592 B1 | 6/2002 | Saito et al. | 360/235.2 |
| 6,417,109 B1 * | 7/2002 | Jordan et al. | 438/692 |
| 6,423,240 B1 | 7/2002 | Wang et al. | 216/22 |
| 6,433,965 B1 * | 8/2002 | Gopinathan et al. | 360/235.4 |
| 6,503,406 B1 | 1/2003 | Hsiao et al. | 216/22 |
| 6,583,953 B1 | 6/2003 | Han et al. | 360/122 |
| 6,728,069 B2 * | 4/2004 | Otsuka et al. | 360/235.8 |
| 6,960,117 B1 * | 11/2005 | Mahadev et al. | 451/37 |
| 7,236,329 B2 * | 6/2007 | Kubotera | 360/236.3 |
| 7,239,479 B2 * | 7/2007 | Sasaki et al. | 360/125.33 |
| 7,248,445 B2 * | 7/2007 | Nishiyama | 360/324.1 |
| 7,460,336 B1 * | 12/2008 | Cha et al. | 360/235.8 |
| 2002/0102776 A1 * | 8/2002 | Yamazaki et al. | 438/149 |
| 2004/0150911 A1 * | 8/2004 | Sasaki et al. | 360/126 |

OTHER PUBLICATIONS

Noritaka Akita, Yoshiyuki Konishi, Shinichi Ogura, "DLC Deposition System for GMR Head and its Process Development," 2001, Japanese Journal, vol. 58, No. 1-2 (Dec. 2001).

* cited by examiner

METHOD FOR MINIMIZING MAGNETICALLY DEAD INTERFACIAL LAYER DURING COC PROCESS

FIELD OF THE INVENTION

The present invention relates to carbon overcoat processes for electronic components and more particularly, this invention relates to a method for minimizing a substantially magnetically-dead layer by optimizing processing parameters.

BACKGROUND OF THE INVENTION

In a disk drive, a magnetic recording head is made of read and write elements. The write element is used to record and erase data bits arranged in circular tracks on the disk while the read element plays back a recorded magnetic signal. The magnetic recording head is mounted on a slider which is connected to a suspension arm, the suspension arm urging the slider toward a magnetic storage disk. When the disk is rotated the slider flies above the surface of the disk on a cushion of air which is generated by the rotating disk.

The read element is generally made of a small stripe of multilayer magnetic thin films which have either magnetoresistance (MR) effect or giant magnetoresistance (GMR) effect, namely which changes resistance in response to a magnetic field change such as magnetic flux incursions (bits) from magnetic storage disk. Recorded data can be read from a magnetic medium because the external magnetic field from the recorded medium (the signal field) causes a change in the direction of magnetization in the read element, which in turn causes a change in resistance in the read element and a corresponding change in the sensed current or voltage.

FIGS. 1 and 2 illustrate examples of a conventional composite type thin-film magnetic head 10. FIG. 1 is a cross-sectional view of the head 10 perpendicular to the plane of the air bearing surface (ABS). FIG. 2 shows the slider 11 flying above the disk 13.

In these figures, the reference numeral 12 denotes a substrate, 15 denotes an undercoating, 20 denotes a lower shield layer of the MR reproducing head part (also known as a read head), 21 denotes an upper shield layer of the MR head part, which can also act as a lower pole of an inductive recording head part (also known as write head), 22 denotes a MR layer provided through an insulating layer 23 between the lower shield layer 20 and the upper shield layer 21, 26 denotes a write gap layer, 27 denotes a lower insulating layer deposited on the upper shield layer 21, 28 denotes a coil conductor formed on the lower insulating layer 27, 29 denotes an upper insulating layer deposited so as to cover the coil conductor 28, 30 denotes an upper pole, and 34 denotes a pad that would connect the read or write coil to other components in the drive. In general, there would be a plurality of pads 34 on the slider 11. Note that the pad 34 connects directly to the coil conductor 28. The upper pole 30 is magnetically connected with the lower pole (upper shield layer) 21 at its rear portion so as to constitute a magnetic yoke together with the lower pole 21.

As recording density and data transfer rate have increased over the past a few years, critical dimensions in the recording device such as track width read and write gap and coil size have decreased accordingly. Also, the fly height between the air bearing surface (ABS) 32 and the media have become smaller and smaller. For reference, recording heads with 40 GB/in$^2$ products typically have fly heights of about 12 nanometers. This fly height will continue to decrease in the future.

This reduction in head critical dimensions and fly height, while beneficial to magnetic performance, also comes with cost of mechanical reliability.

As shown in FIG. 3, on a typical slider 11, a layer of diamond-like carbon (DLC) 40 is added to the ABS 32 as a protective layer for tribological and environmental protection reasons, e.g., to protect the device from damage from mechanical contact with the disk 13 as well as corrosion. The layer of DLC 40 is adhered to the device by a layer of a silicon-containing adhesive 42. When such a protective coating is deposited onto the slider ABS 32, an interface between the adhesive film 42 and substrate 11 forms and usually results in formation of an alloy intermetallic compound from parent element/alloy constituents. Particularly, interfacial metal-silicide intermetallics are formed between the head magnetic device 11 and the carbon overcoat (COC) film 40. Such interfacial metal-silicide intermetallics are usually paramagnetic and constitute a paramagnetic deadlayer 44 increasing the effective or true magnetic spacing during use. Because the heads are designed to function at a nominal magnetic spacing, the silicide layer alters the properties of the device from the optimum design. Therefore, it is of great importance to reduce this intermetallic layer thickness by sharpening the interface between the adhesive layer 42 and device 11.

What is therefore needed is a method for creating a COC in which the magnetic deadlayer is minimized. In this way, the effective magnetic spacing can be reduced for the same physical magnetic distance. A reduction of magnetic spacing would directly contribute to improvement in head read and overwrite performance in a drive.

SUMMARY OF THE INVENTION

All prior methods heretofore known have used a glancing angle for the ion beam etch angle, i.e., at least about 75 degrees from normal (a line or plane extending perpendicular to the surface). A glancing angle has been heretofore believed to be best for cleaning the surface to be protected.

While no one has recognized that the etch angle affects deadlayer thickness, intuitively, a glancing etch angle should minimize the deadlayer, and a lower angle (as measured from the surface normal) should create a larger deadlayer due to the more direct momentum transfer (in layman terms, more forceful bombardment), and expected increased damage to the inherent material structure. However, the inventors have surprisingly found that by changing the ion beam etch angle, the activation and chemical potential of the treated surface may be tuned so that the metal silicide interface thickness during subsequent Si and DLC deposition may be reduced, achieving a smaller magnetic deadlayer.

Accordingly, a method for applying a protective layer to an electronic device such as the ABS of a slider, magnetic head, etc. for reducing paramagnetic deadlayer thickness includes selecting an etching angle for minimizing formation of a paramagnetic deadlayer at an interface of an electronic device and an adhesive layer subsequently formed on the electronic device, etching a surface of an electronic device at the selected angle, the selected angle being less than about 75 degrees from an imaginary line extending perpendicular to the surface, forming an adhesive layer on the etched surface of the electronic device, and forming a protective layer on the adhesive layer. A magnetic head formed by the process is also disclosed.

The method has been found to be particularly useful where the adhesion layer is an amorphous silicon-containing film, and also where the electronic device includes nickel.

The preferred etching angle is between about 5 and about 65 degrees, and more preferably between about 40 and about 65 degrees.

A magnetic head formed by the process has an air bearing surface, a read head and/or a write head adjacent the air bearing surface of the head, a layer of amorphous silicon-containing adhesive formed on the air bearing surface, and a protective carbonaceous layer formed on the adhesive layer. The air bearing surface of the head has been etched at an angle of less than about 75 degrees from an imaginary line extending perpendicular to the air bearing surface.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

Prior Art

Prior Art

Prior Art

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 4:
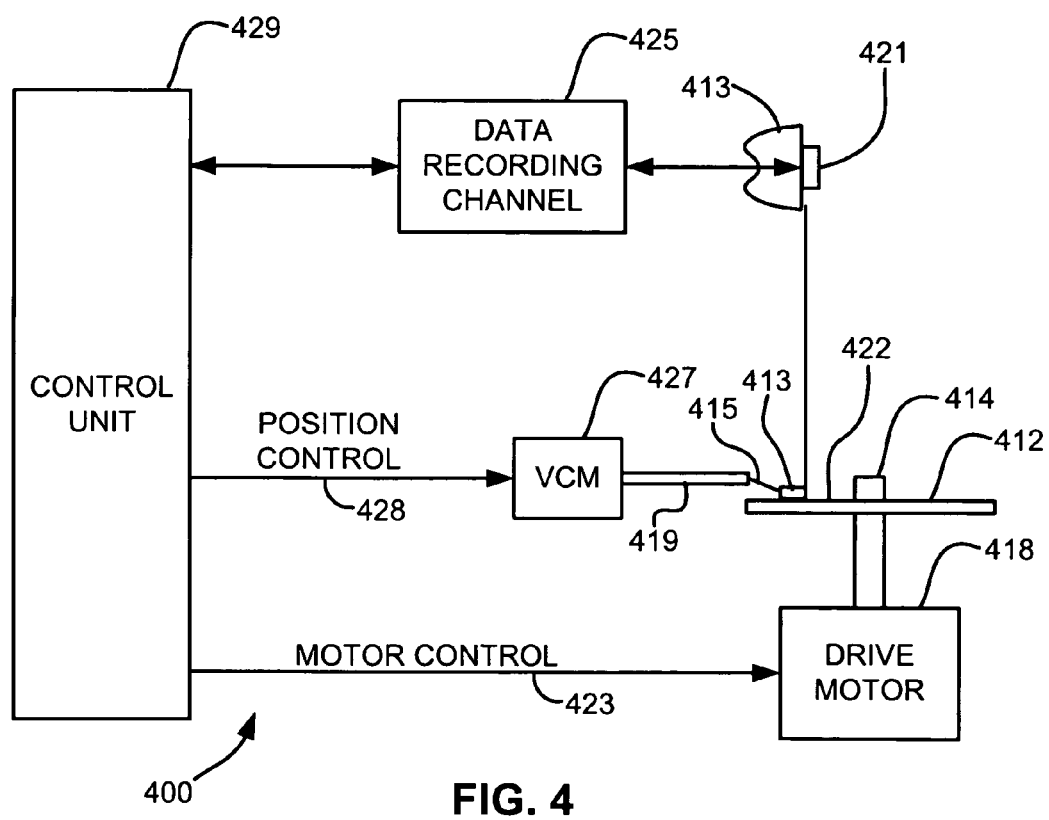
FIG. 4 is a simplified system diagram of a magnetic disk drive system in accordance with one embodiment.

Referring now to FIG. 4, there is shown a disk drive 400 embodying the present invention. As shown in FIG. 4, at least one rotatable magnetic disk 412 is supported on a spindle 414 and rotated by a disk drive motor 418. The magnetic recording on each disk is in the form of an annular pattern of concentric data tracks (not shown) on the disk 412.

Figure 1:
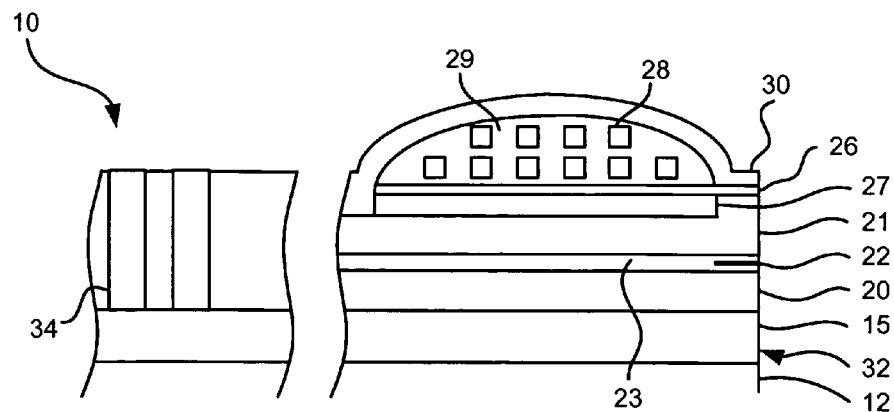
FIG. 1 is a cross-sectional view of a conventional composite type magnetic head, not to scale, perpendicular to the plane of the ABS.
Figure 2:
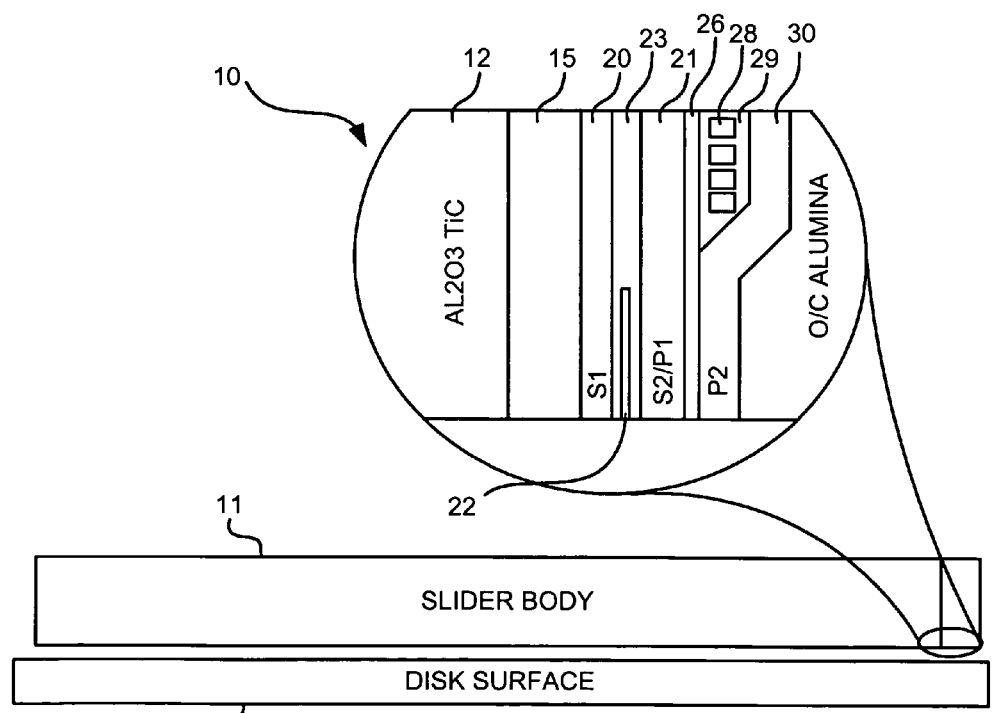
FIG. 2 shows a slider, not to scale, flying above the disk.

At least one slider 413 is positioned near the disk 412, each slider 413 supporting one or more magnetic read/write heads 421 (see FIGS. 1 and 2). As the disks rotate, slider 413 is moved radially in and out over disk surface 422 so that heads 421 may access different tracks of the disk where desired data are recorded. Each slider 413 is attached to an actuator arm 419 by way of a suspension 415. The suspension 415 provides a slight spring force which biases slider 413 against the disk surface 422. Each actuator arm 419 is attached to an actuator means 427. The actuator means 427 as shown in FIG. 4 may be a voice coil motor (VCM). The VCM comprises a coil movable within a fixed magnetic field, the direction and speed of the coil movements being controlled by the motor current signals supplied by controller 429.

During operation of the disk storage system, the rotation of disk 412 generates an air bearing between slider 413 and disk surface 422 which exerts an upward force or lift on the slider. The air bearing thus counter-balances the slight spring force of suspension 415 and supports slider 413 off and slightly above the disk surface by a small, substantially constant spacing during normal operation.

The various components of the disk storage system are controlled in operation by control signals generated by control unit 429, such as access control signals and internal clock signals. Typically, control unit 429 comprises logic control circuits, storage means and a microprocessor. The control unit 429 generates control signals to control various system operations such as drive motor control signals on line 423 and head position and seek control signals on line 428. The control signals on line 428 provide the desired current profiles to optimally move and position slider 413 to the desired data track on disk 412. Read and write signals are communicated to and from read/write heads 421 by way of recording channel 425.

The above description of a typical magnetic disk storage system and the accompanying illustration of FIG. 4 are for representation purposes only. It should be apparent that disk storage systems may contain a large number of disks and actuators, and each actuator may support a number of sliders.

Figure 5:
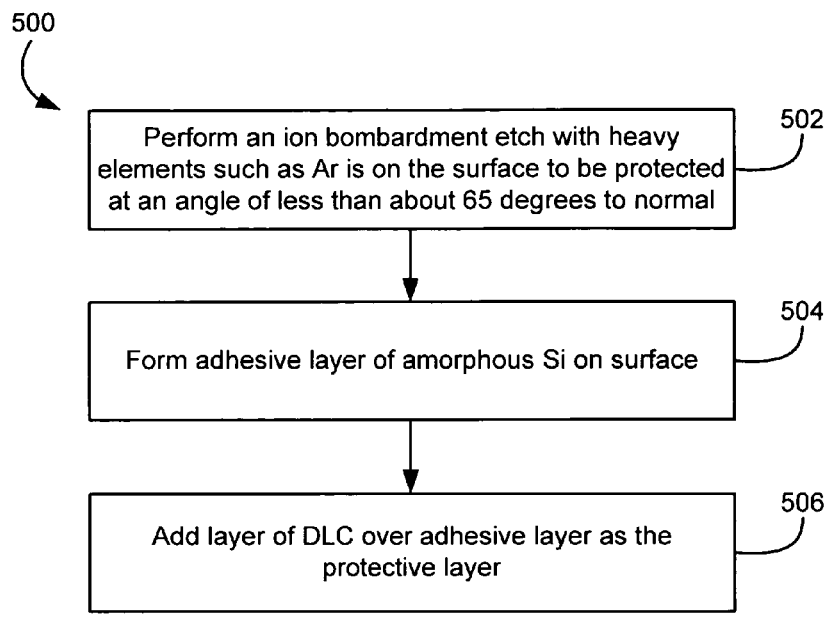
FIG. 5 is a flow diagram of a process for forming a COC on an electronic device according to one embodiment.

As mentioned above, a carbon overcoat (COC) is typically applied to the slider, and consequently the read/write heads for tribological and environmental protection reasons. FIG. 5 depicts a process 500 for forming a COC on an electronic device such as a slider. In step 502, an ion bombardment etch with heavy elements such as Ar is performed for cleaning the surface to be protected. Note that while an ion beam source can be used, ion bombardment induced by other types of etch sources are within the scope of the present invention.

Figure 3:
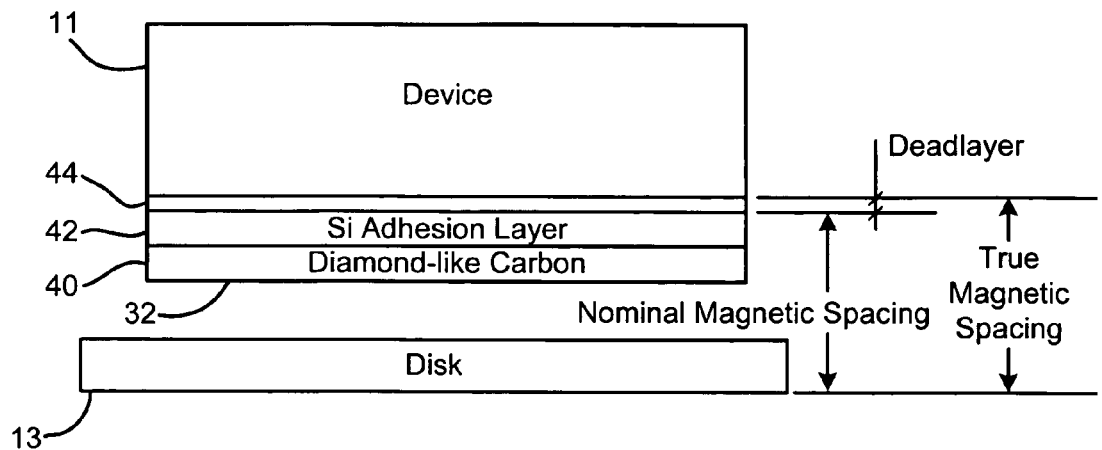
FIG. 3 is a representative view, not to scale, showing a slider having a carbon overcoat layer.

In step 504, a layer of amorphous Si is formed, such as by sputtering, for improving adhesion of the protective coating applied in step 506. In step 506, a DLC layer is added as the protective layer. However, as mentioned above with reference to FIG. 3, when Si is sputtered onto the device, a paramagnetic deadlayer forms at the interface of the adhesive and device. For instance, a diffusion results between the Si and device, the Si reacting with the metal in the device to form a silicide.

Many prior methods heretofore known have used a glancing angle for the ion beam etch angle, i.e., at least about 75 degrees from normal (a line or plane extending perpendicular to the surface). A glancing angle has been heretofore believed to be best for cleaning the surface to be protected.

While no one has recognized that the etch angle affects deadlayer thickness, intuitively, a glancing etch angle should minimize the deadlayer, and a higher angle should create a larger deadlayer due to the more direct momentum transfer, in layman terms forceful bombardment, and expected increased damage to the inherent material structure. However, the inventors have surprisingly found that by changing the ion beam etch angle, the activation and chemical potential of the treated surface may be tuned so that the metal silicide interface thickness during subsequent Si and DLC deposition may be reduced, achieving a smaller paramagnetic deadlayer.

While not wishing to be bound by any theory, the inventors believe that the glancing etch angle promotes surface diffusion, migration, and resputtering, which provides more sites for diffusion to occur. In addition, a glancing angle promotes surface activation, as the kinetics do not allow for significant relaxation, making the surface materials more energetic and therefore more apt to form compounds.

Accordingly, the inventors have found that the by moving the etch angle in step 502 away from glancing, e.g. from above about 75 from normal to below about 75 degrees from normal, the interfacial magnetic deadlayer is reduced. As will be described below, in one experiment, the deadlayer was reduced by 0.7 nm. In today's typical flight height (FH), this is about a 10% improvement in the true FH, and will be even more significant when FH technology pushes further to the limit.

Figure 6:
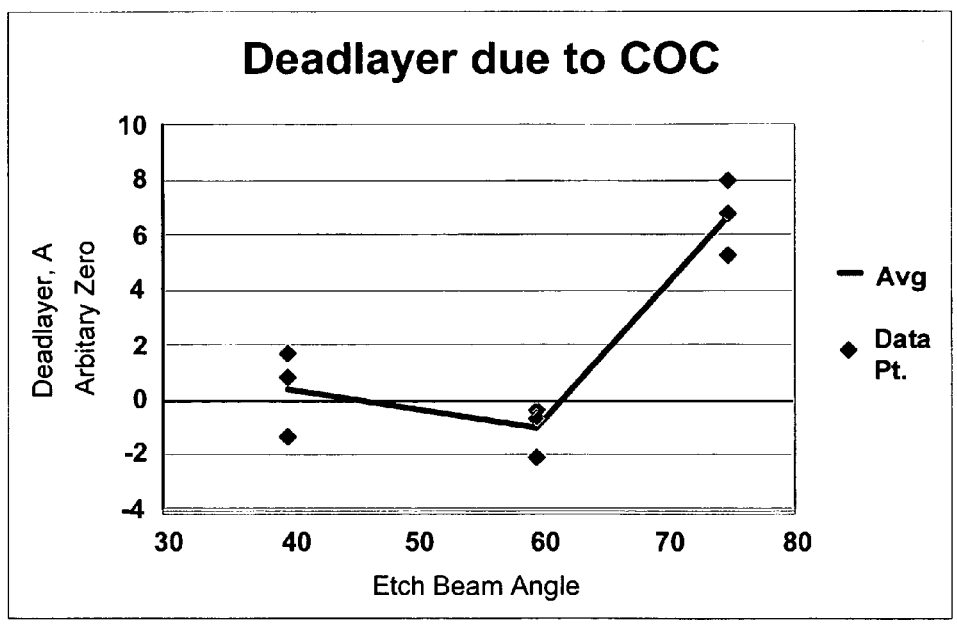
FIG. 6 is a chart illustrating a change in deadlayer thickness as function of incident ion beam etch angle.

FIG. 6 shows a change in deadlayer thickness in angstroms (Å) as function of incident ion beam angle plotted referencing an arbitrarily selected state (arbitrary zero). As shown, the deadlayer thickness is greatly reduced at beam angles below about 65 degrees, and for the head tested, is most reduced at an etch angle of about 60 degrees. The preferred etch angles are in the range of about 5 to about 65 degrees from normal, more preferably about 40 to about 65 degrees from normal.

One skilled in the art will appreciate that there are many other controllable parameters in the etch process that may not be sensitive to deadlayer generation, but essential for sustaining a plasma etch process.

A description of how the inventors have measured the deadlayer during development of the present invention follows.

In one experiment, an 80/20 NiFe permalloy film was sputtered on a glass substrate (coupon) as a vehicle to demonstrate the reduction of the paramagnetic deadlayer. An ion beam source was used for an Ar sputter clean (step 502). By decreasing the ion beam incident angle away from substrate plane normal, the inventors observed that, with the same subsequent deposition process of Si and DLC, the loss of magnetic thickness increased as compared with physical thickness measurement.

In characterizing the deadlayer, X-Ray Florescence (XRF) verified by X-Ray Reflectivity (XRR) was used to measure the NiFe physical (chemical) thickness. The amount of NiFe on the coupon can be determined by its thickness, since on a round coupon its diameter is the same. During XRF, the coupon is irradiated with X-rays to create fluorescence. The light emitted is proportional to the number of atoms present. The chemical measure true physical thickness of magnetic layer (including deadlayer since NiFe present in deadlayer).

The layer of NiFe also has a magnetic moment that saturates with the moment of the driving field. A B-H Looper (BHL) was used to measure the magnetic thickness, where B is the magnetic flux and H is the driving field. The magnetic saturation moment is proportional to magnetic material presence. In this case, the magnetic saturation moment was measured by BHL and calibrated to thickness by a stylus measurement such as AFM.

The change in the thickness difference between XRF and BHL as a function of process condition constitutes the magnetic deadlayer change. That is, the difference between magnetically and chemically measured thickness is due to formation of the paramagnetic intermetallic compound at the interface. Note that a native deadlayer of oxide material may be present on the NiFe, even after the cleaning etch, so the measurements thus obtained may be adjusted to account for this.

Through these experiments, the inventors have also found that Si has a preference to react or complex with Ni during a COC process, and tends to infiltrate the device more deeply if Ni is present (as compared to higher Fe). Thus, the method presented herein is of particular importance to devices containing Ni, such as read heads and other magnetic devices.

The inventors have also found that the method of forming the layer of DLC in step 506 does not significantly affect the formation of the deadlayer. For instance, experimentation has shown that creation of the DLC layer by cathodic arc carbon (FCAC) vs. ion beam carbon (IBC) results in about the same deadlayer thickness. For those not familiar with DLC formation, IBC uses ion beam energy to form the DLC. IBC processes use high kinetic energy. The FCAC instead uses high density plasma and arcing (as opposed to high kinetic energy).

Figure 7:
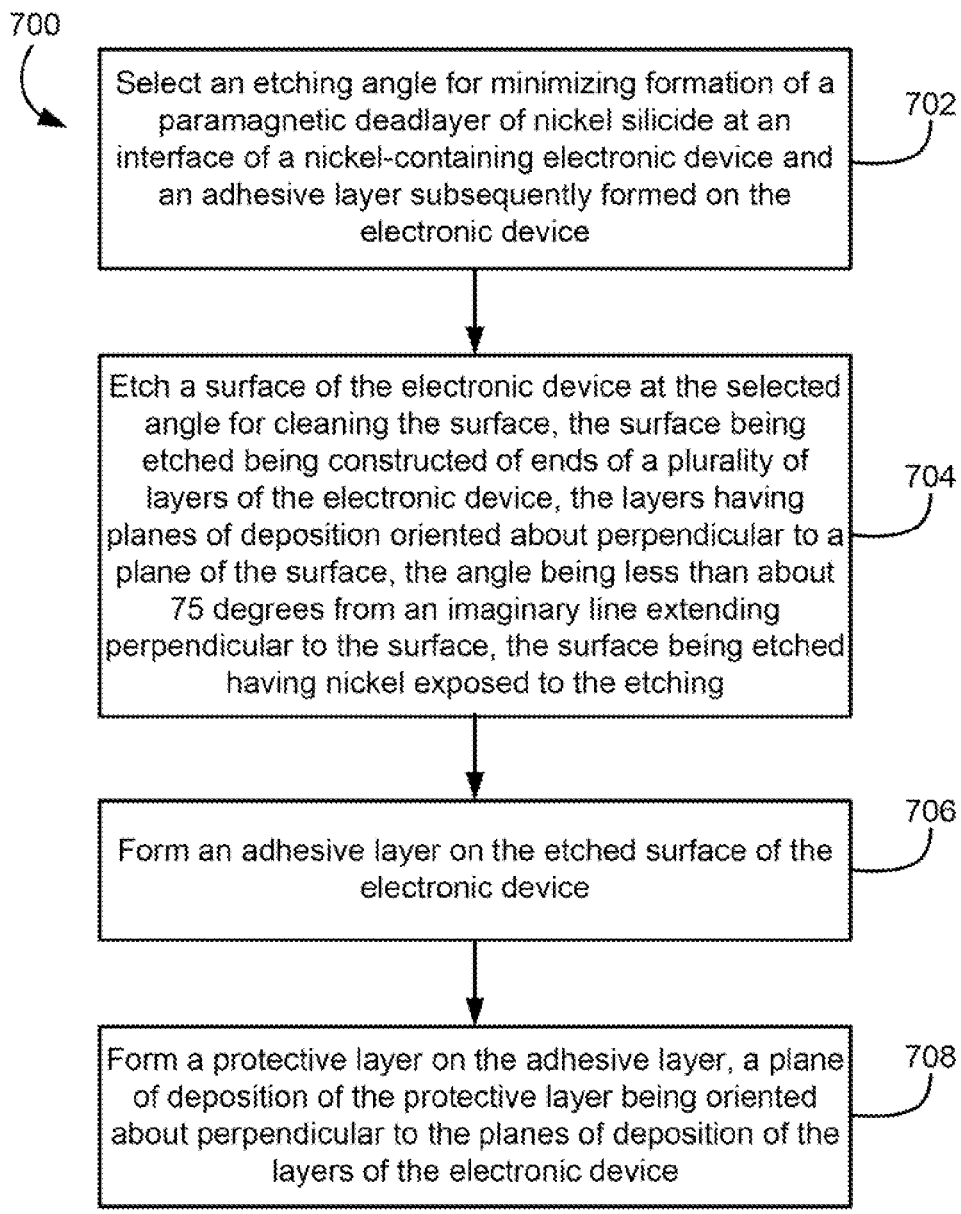
FIG. 7 is a flow diagram of a method for minimizing a paramagnetic deadlayer created during formation of a protective layer on an electronic device.

FIG. 7 illustrates a method 700 for minimizing a paramagnetic deadlayer created during formation of a protective layer on an electronic device. In operation 702, an etching angle is selected for minimizing formation of a paramagnetic deadlayer of nickel silicide at an interface of a nickel-containing electronic device and an adhesive layer subsequently formed on the electronic device. In step 704, a surface of the electronic device is etched at the selected angle for cleaning the surface, the surface being etched being constructed of ends of a plurality of layers of the electronic device, the layers having planes of deposition oriented about perpendicular to a plane of the surface, the angle being less than about 75 degrees from an imaginary line extending perpendicular to the surface, the surface being etched having nickel exposed to the etching. In step 706, an adhesive layer is formed on the etched surface of the electronic device. In step 708, a protective layer is formed on the adhesive layer, a plane of deposition of the protective layer being oriented about perpendicular to the planes of deposition of the layers of the electronic device.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for minimizing a paramagnetic deadlayer created during formation of a protective layer on an electronic device, comprising:
    selecting an etching angle for minimizing formation of a paramagnetic deadlayer of nickel silicide at an interface of a nickel-containing electronic device and an adhesive layer subsequently formed on the electronic device;
    etching a surface of the electronic device at the selected angle for cleaning the surface, the surface being etched being constructed of ends of a plurality of layers of the electronic device, the layers having planes of deposition oriented about perpendicular to a plane of the surface, the angle being less than about 75 degrees from an imaginary line extending perpendicular to the surface, the surface being etched having nickel exposed to the etching;
    forming an adhesive layer on the etched surface of the electronic device; and
    forming a protective layer on the adhesive layer, a plane of deposition of the protective layer being oriented about perpendicular to the planes of deposition of the layers of the electronic device.

2. The method as recited in claim 1, wherein the electronic device is a slider.

3. The method as recited in claim 1, wherein the electronic device is a magnetic head.

4. The method as recited in claim 3, wherein the surface is an air bearing surface.

5. The method as recited in claim 1, wherein the adhesive is an amorphous silicon-containing adhesive.

6. The method as recited in claim 1, wherein the electronic device includes a reproducing head part, wherein the reproducing head part is etched during the etching.

7. The method as recited in claim 1, wherein the protective layer is carbonaceous.

8. The method as recited in claim 7, wherein the protective layer is diamond like carbon.

9. The method as recited in claim 1, wherein the etching angle is between about 5 and about 65 degrees.

10. The method as recited in claim 1, wherein the etching angle is between about 40 and about 65 degrees.

11. An electronic device formed by the method as recited in claim 1.

12. A method for minimizing a paramagnetic deadlayer created during formation of a protective layer on a magnetic head, comprising:
 selecting an etching angle for minimizing formation of a paramagnetic deadlayer of nickel silicide at an interface of a nickel-containing layer of a magnetic head and an adhesive layer subsequently formed on the media-facing surface of the magnetic head;
 etching the media-facing surface of the magnetic head at the selected angle for cleaning the media-facing surface, the angle being less than about 75 degrees from an imaginary line extending perpendicular to the media-facing surface, the nickel-containing layer being exposed to the etching;
 forming an adhesive layer on the etched surface of the magnetic head; and
 forming a protective carbonaceous layer on the adhesive layer.

13. The method as recited in claim 12, wherein a plane of deposition of the protective carbonaceous layer is oriented parallel to the etched surface.

14. The method as recited in claim 12, wherein the protective layer is diamond like carbon.

15. The method as recited in claim 12, wherein the etching angle is between about 5 and about 65 degrees.

16. The method as recited in claim 12, wherein the etching angle is between about 40 and about 65 degrees.

17. A head formed by the method as recited in claim 12.

18. A method for minimizing a paramagnetic deadlayer created during formation of a protective layer on a magnetic head, comprising:
 selecting an etching angle for minimizing formation of a paramagnetic deadlayer of nickel silicide at an interface of a nickel-containing magnetic head and an adhesive layer subsequently formed on the magnetic head;
 ion bombardment etching a media-facing surface of the magnetic head at the selected angle for cleaning the surface, the angle being less than about 75 degrees from an imaginary line extending perpendicular to the media-facing surface;
 sputtering a layer of amorphous silicon-containing adhesive onto the etched surface of the magnetic head; and
 forming a protective carbonaceous layer on the adhesive layer.

19. A method for minimizing a paramagnetic deadlayer created during formation of a protective layer on an electronic device, comprising:
 selecting an etching angle for minimizing formation of a paramagnetic deadlayer of a metal silicide at an interface of the electronic device and an adhesive layer subsequently formed on the electronic device;
 etching a surface of the electronic device at the selected angle for cleaning the surface, the angle being less than about 75 degrees from an imaginary line extending perpendicular to the surface, the surface being etched having at least one metallic layer exposed to the etching, wherein the surface being etched lies along a plane oriented about perpendicular to a plane of deposition of the metallic layer, wherein an upper surface of the metallic layer is not exposed to the etching;
 forming an adhesive layer on the etched surface of the electronic device; and
 forming a protective layer on the adhesive layer, a plane of deposition of the protective layer being oriented about perpendicular to the plane of deposition of the metallic layer of the electronic device.

20. The method as recited in claim 19, wherein the electronic device includes a reproducing head part, wherein the reproducing head part is etched during the etching.

21. The method as recited in claim 1, wherein a deposition thickness of the layers exposed to the etching is not reduced by the etching.

22. The method as recited in claim 12, wherein a deposition thickness of a nickel-containing layer exposed to the etching is not reduced by the etching, the media-facing surface being etched being constructed of ends of a plurality of layers of the electronic device, the layers having planes of deposition oriented about perpendicular to a plane of the surface, wherein a plane of deposition of the protective layer being oriented about perpendicular to the planes of deposition of the layers of the electronic device.

* * * * *